(12) United States Patent
Kim et al.

(10) Patent No.: US 7,764,738 B2
(45) Date of Patent: Jul. 27, 2010

(54) ADAPTIVE MOTION ESTIMATION AND MODE DECISION APPARATUS AND METHOD FOR H.264 VIDEO CODEC

(75) Inventors: Yong-Hwan Kim, Anyang-si (KR); Je-Woo Kim, Seoul (KR); Hyeok-Koo Jung, Pyeongtaek-si (KR); Joonki Paik, Seoul (KR)

(73) Assignee: Korea Electronics Technology Institute, Pyung Taek-Si, Kyunggi-Do (KR)

( * ) Notice: Subject to any disclaimer, the term of this patent is extended or adjusted under 35 U.S.C. 154(b) by 1438 days.

(21) Appl. No.: 10/976,781

(22) Filed: Nov. 1, 2004

(65) Prior Publication Data

US 2006/0039470 A1 Feb. 23, 2006

(30) Foreign Application Priority Data

Aug. 19, 2004 (KR) ...................... 10-2004-0065439

(51) Int. Cl.
H04N 7/12 (2006.01)
(52) U.S. Cl. ............................................... 375/240.12
(58) Field of Classification Search ............ 375/240.03, 375/240.28, 240.02
See application file for complete search history.

(56) References Cited

U.S. PATENT DOCUMENTS

| | | | |
|---|---|---|---|
| 5,280,349 A * | 1/1994 | Wang et al. ............ | 375/240.23 |
| 6,879,723 B1 * | 4/2005 | Helman ....................... | 382/232 |
| 7,190,840 B2 * | 3/2007 | Said ............................ | 382/248 |
| 7,333,544 B2 * | 2/2008 | Kim et al. ............... | 375/240.16 |
| 2002/0025001 A1 * | 2/2002 | Ismaeil et al. .......... | 375/240.16 |

* cited by examiner

*Primary Examiner*—Tung Vo
*Assistant Examiner*—Anner Holder
(74) *Attorney, Agent, or Firm*—Edell, Shapiro & Finnan, LLC

(57) ABSTRACT

Disclosed herein is an adaptive motion estimation and mode decision apparatus and method for an H.264 video codec. The apparatus includes a background image detection unit, an inter mode inspection unit, an intra mode inspection unit and a mode inspection skip unit. The background image detection unit inspects whether a fixed background or slowly and regularly moving block exists, and skips the step of dividing a first corresponding macroblock into smaller sized blocks and performing block mode inspection. The inter mode inspection unit inspects whether an irregularly or fast moving macroblock exists, and determines whether to divide a corresponding macroblock into smaller sized blocks and to perform block mode inspection on the smaller sized blocks. The intra mode inspection unit performs AZCB inspection on the macroblocks, and determines whether to divide a corresponding macroblock into smaller sized blocks block and to perform mode inspection on the smaller sized blocks. The mode inspection skip unit skips the block mode inspection for the smaller sized blocks.

17 Claims, 6 Drawing Sheets

ADAPTIVE MOTION ESTIMATION AND MODE DECISION APPARATUS AND METHOD FOR H.264 VIDEO CODEC

RELATED APPLICATIONS

The present disclosure relates to subject matter contained in priority Korean Application No. 10-2004-0065439, filed on 19 Aug. 2004, which is herein expressly incorporated by reference in its entirety.

BACKGROUND OF THE INVENTION

1. Field of the Invention

The present invention relates generally to an adaptive motion estimation and mode decision apparatus and method for an H.264 video codec and, more particularly, to an adaptive motion estimation and mode decision apparatus and method for an H.264 video codec, in which the amount of calculation required for motion estimation and macroblock mode decision is minimized without deterioration of image quality by executing a motion estimation module and a macroblock mode decision module, which perform the largest amount of calculation in an H.264 video coder, in combination with each other, and the amount of calculation is further minimized by performing intra prediction and mode decision using surrounding block information.

2. Description of the Related Art

H.264 is a new video coding standard offering a considerably high compression rate compared to conventional methods, and referred to as a "Moving Picture Experts Group (MPEG)-4 Advanced Video Coding (AVC)." The H.264 standard offers a compression rate about two times higher than that of a conventional MPEG-4 Advanced Simple Profile (ASP) and improved quality, and can offer Digital Versatile Disk (DVD)-level high quality video data at a speed below 1 Mbps.

Such an H.264 standard employs a block-based hybrid Motion Compensated Prediction (MCP)/transform model, similar to conventional video coding standards. However, the H.264 standard employs algorithms different from those used in conventional MPEG-2, H.263+ and MPEG-4 visual standards so as to provide high quality images that are highly compressed.

Technologies used in the H.264 standard are described below. The H.264 standard includes a variable block-size motion compensation technology in which a single macroblock is set to a block having 16×16 pixels and the macroblock can be divided into variable-sized blocks. Furthermore, according to the technologies used in the H.264 standard, ¼ pixel-based motion compensation, and more accurate motion estimation and compensation using multiple reference frames are achieved. Furthermore, there is a function of intra prediction in a pixel domain that did not exist in the conventional video coding standard, so that similarity can be predicted using adjacent blocks in the same frame, thus increasing the compression rate. While the conventional video coding standard performs residual coding on 8×8 pixel blocks, the H.264 standard performs 4×4 block integer transform that is modified from 4×4 block Discrete Cosine Transform (DCT), thus not only reducing the amount of calculation but also solving an Inverse Discrete Cosine Transform (IDCT) mismatch problem existing in the conventional video coding standard. Furthermore, Context-based Adaptive Variable Length Coding (CAVLC) and Context-based Binary Arithmetic Coding (CABAC) algorithms are employed in entropy coding, thus increasing the compression rate. Furthermore, an in-loop adaptive deblocking filter is employed, so that the quality of restored images is increased, thus enabling images to be coded into more high quality images.

FIG. 1 is a block diagram showing an example of a coder used in a conventional H.264 video standard. As shown in the drawing, the conventional H.264 video coder includes a Motion Estimation (ME) module 110, a Motion Compensation (MC) module 115, an Intra Mode Estimation (IME) module 120, an Intra Prediction (IP) module 125, a dequantization ($Q^{-1}$) module 140, an inverse transform ($T^{-1}$) module 145, an entropy coding module 150, a deblocking filter 155 and a frame memory 160.

The ME module 110 performs a function of searching several reference images 105 for finding a motion vector, and a macroblock mode decision function of searching for an optimal macroblock type having a minimum bit rate and the minimum number of errors. The MC module 115 functions to obtain a compensation image from the reference images 115 according to the motion vector and the macroblock mode type that are searched for by the ME module 110. The IME module 120 functions to select an optimal intra prediction mode [four prediction modes exist in the case of I16×16 (intra 16×16 block) and nine prediction modes exist in the case of I4×4 (intra 4×4 block)] by performing prediction using adjacent blocks at the time of performing intra coding on a macroblock. The IP module 125 functions to obtain the intra-predicted compensation image from previously coded adjacent blocks using the intra prediction mode selected by the IME module 120.

The T module 130 performs 4×4 block integer transform that is modified from 4×4 block DCT. The Q module 135 functions to quantize coefficients transformed by the T module 130. Since the 4×4 block integer transform used in the H.264 standard is not orthogonal, it must be compensated by the Q module 135. Accordingly, the T module 130 and the Q module 135 must be used in conjunction with each other. The $T^{-1}$ module 145 and the $Q^{-1}$ module 140 perform the reverse operation of the T module 130 and the Q module 135, respectively. The operation result of the $T^{-1}$ module 145 is restored images that have not passed through the deblocking filter 155. The entropy coding module 150 performs entropy coding using bit allocation based on the probability of the occurrence of quantized DCT coefficients. The deblocking filter module 155 functions to improve the restored images, which are obtained through the $T^{-1}$ module 145, to higher quality images, and the improved images are stored in the frame memory module 160 to be used as references for images input later.

Unlike conventional MPEG-1, MPEG-2 and MPEG-4 standards, the H.264 standard has several reference images, and a plurality of previously coded images as well as an immediately prior frame can be used as the reference images. This is called multiple reference frames.

Similar to the conventional MPEG standards, an I_slice, a P_slice, a B_slice, a SI_slice and a SP_slice exist in the H-264 standard, and the H-264 standard performs coding in slices. For convenience of a description, a slice can be regarded as a single frame. That is, the I_slice, the P_slice and the B-slice are almost the same as the I_picture, P_picture and B_picture of the conventional MPEG standards, respectively. The SI_slice and the SP_slice are newly designed slice forms in the H.264 standard, and are used for a specific purpose. The SI_slice and the SP_slice are described in more detail in a related document, Draft ITU-T Rec. and FDIS of Joint Video Spec. (H.264|ISO/IEC 14496-10 AVC), JVT of ISO/IEC MPEG and ITU-T VCEG, Doc. JVT-G050r1, Geneva, pp. 23-27, May 2003.

The operation of the H.264 video coder is described below.

In the case of an I_slice, optimal intra prediction is performed by executing the IME module 120 and the IP module 125 while the ME module 110 and the MC module 115 are not executed, and quantized DCT coefficients are obtained by executing the T module 130 and the Q module 135 on the differential image between a compensation image and an original image. A bit string is generated by performing the entropy coding on the results.

For the following input slices, the differential image is restored by executing the $Q^{-1}$ module 140 and $T^{-1}$ module 145, and a restored image is made by combining the restored differential image and the compensated image together. The restored image is stored in the frame memory 160 through the deblocking filter 155. In this case, an image before passing through the deblocking filter 155 is used as the image for the intra prediction.

In the case of a P_slice, an optimal motion vector and a macroblock mode are determined by executing the ME module 110 and the MC module 115. Furthermore, intra prediction is performed by executing the IME module 120 and the IP module 125. Thereafter, a result of the performance of the ME module 110 and the MC module 115 is compared with a result of the performance of the IME module 120 and the IP 125, and the better result is selected and a compensated image is obtained. The following operations are the same as for the I_slice.

In the case of a B_slice, the same operation as for the P_slice is performed, but the B_slice is different from the P_slice in that future images as well as past images are used as the reference images.

In the H.264 standard, various sized block modes exist. For example, in the case of the P_slice, block modes, such as SKIP, I16×16, I4×4, P16×16, P16×8, P8×16, P8×8, P8×4, P4×8 and P4×4 block modes, exist. A method of selecting an optimal block mode from the block modes is Rate-Distortion Optimization (RDO) technique. A motion estimation and mode decision algorithm using the RDO can save a bit rate by 5 to 10% at the cost of 30% to 40% encoding speed. Such an algorithm is disclosed in a thesis entitled "An improved H.26L coder using Lagrangian coder control," by H. Schwarz and T. Wiegand (refer to H. Schwarz and T. Wiegand, "An improved H.26L coder using Lagrangian coder control," "ITU-T/SG 16/VCEG-D146a," June 2001, Porto Seguro, Brazil).

The ME module 110 performs such block mode selection, and conventional algorithms are described below.

The algorithm of the ME module 110 using the RDO is a Full ME (FME) or Full Mode Decision (FMD) algorithm implemented in JM72 that is H.264 reference software (refer to http://bs.hhi.de/~suchring/tml/download). This algorithm performs motion estimation for all possible block sizes using Equation 1 as an optimal function in order to obtain an optimal Motion Vector (MV) for each of the block sizes and a $J_{motion}$ value that is a Rate-Distortion cost (RDcost).

$$J_{motion}(m,REF|\lambda_{motion})=SAD(s,c(REF,m))+\lambda_{motion}\cdot(R(m-p)+R(REF)) \quad (1)$$

where m is $(m_x,m_y)^T$, REF is a reference picture, p is $(p_x,p_y)^T$ and is an MV used for prediction in MV coding, $\lambda_{motion}$ is a Lagrangian multiplier, R(m−p) is bits used to code the MV and R(REF) is bits used to code the REF.

SAD is defined as follows:

$$SAD(s, c(REF, m)) = \sum_{x,y} |s(x, y) - c(x - m_x, y - m_y)|$$

Thereafter, with respect to each of all possible modes, $J_{mode}$, which is an RDcost value for a mode, is obtained using Equation 2, $$J_{mode}(s,c,MODE|QP,\lambda_{mode})=SSD(s,c,MODE|QP)+\lambda_{mode}\cdot R(s,c,MODE|QP) \quad (2)$$

where SSD is a sum of the square deviations between the original signals and reconstructed signals, $\lambda_{mode}$ is a Lagrangian multiplier, MODE is one of a set of possible macroblock modes, and one of SKIP, P16×16, P16×8, P8×16, P8×8, I4×4 and I16×16 macroblock modes in the case of the P_slice, $$SSD(s, c, MODE|QP) = \sum_{x=1,y=1}^{16,16} (S_Y[x, y] - c_Y[x, y, MODE|QP])^2 +$$

$$\sum_{x=1,y=1}^{8,8} (S_U[x, y] - c_U[x, y, MODE|QP])^2 +$$

$$\sum_{x=1,y=1}^{8,8} (S_V[x, y] - c_V[x, y, MODE|QP])^2, \text{ and}$$

R(s,c,MODE) includes all DCT coefficients, motion information and macroblock headers and is the number of bits related to the selection of MODE. Furthermore, SSD(s,c,MODE) is distortion and R(s,c,MODE) is a rate. That is, Equation 2 is an equation for determining a mode in which the rate and distortion are optimized. Finally, a mode in which $J_{mode}$ is minimized is selected as the macroblock mode.

The macroblock mode decision should be optimized in combination with the motion estimation, but the above-described algorithm provides an technique in which motion estimation and macroblock mode decision are separately performed due to complication and a large amount of calculation.

In addition to the above-described technology, high-speed macroblock mode decision technologies were proposed to increase slow speed attributable to the RDO.

A thesis entitled "Fast mode decision and motion estimation for JVT/H.264," by P. Yin, H. Y. C. Tourapis, A. M. Trouapis, and J. Boyce, Proc. Int. Conf, Image Processing, September 2003 and a thesis entitled "Fast mode decision for H.264 with variable motion block sizes," by J. Lee and B. jeon, Proc. Int. Sym. Computer and Information Sciences, LNCS 2869, pp. 723-730, November 2003 proposed methods of skipping the calculation of a specific mode by comparing the RDcost of each of the macroblock modes with a predetermined threshold value.

Furthermore, a thesis entitled "Fast inter mode selection," by K. P. Lim, S. Wu, D. J. Wu, S. Rahardja, X. Lin, F. Pan and Z. C. Li, Joint Video Team (JVT) of ISO/IEC MPEG and ITU-T VCEG, Doc. JVT-1020, September 2003 proposed a method of determining a macroblock mode at high speed using the edge information of each of the block modes after obtaining an edge directional histogram using a Sobel operator.

Furthermore, a thesis entitled "Fast mode decision for H.264," by B. Jeon and J. Lee, JVT of ISO/IEC MPEG and ITU-T VCEG, Doc. JVT-J033, December 2003 proposed a technology of previously inspecting a SKIP mode to cope with the case where the flat portion of the image or the differential value of the compensated block obtained from a motion vector is considerably small, and selectively performing intra prediction.

The technologies disclosed in the K. P. Lim et al.' thesis and the B. Jeon et al.' thesis were verified as having a relatively small loss of image quality and low loss of compression rate compared to their high speedup, so that the technologies were adopted as a fast high-complexity mode decision model for the test model of the H.264 standard.

FIG. 2 is an example of a method of determining a macroblock mode in the conventional H.264 coder, which is a flowchart showing the operation of the technology disclosed in the B. Jeon et al.'s thesis.

First, an RDcost value is obtained by performing motion estimation on a 16×16 block using reference images at step S110, and it is inspected whether the RDcost value meets the condition of a SKIP mode at step S115. If the RDcost value meets the condition of the SKIP mode, the process of determining that the macroblock mode will not be performed any further and the optimal macroblock mode is determined to be the SKIP mode at step S120.

If the RDcost value does not meet the condition of the SKIP mode, the RDcost value is obtained by performing inter mode coding for each of the block sizes at step S125, and an optimal inter mode is determined using the RDcost value at step S130.

Thereafter, an AR value and an Average Boundary Error (ABE) value are obtained using Equations 3 and 4 at step S135.

$$AR = \frac{1}{384}(\text{number of bits of texture data}) \times \lambda \qquad (3)$$

where $\lambda = 0.85 \times 2^{QP/3}$, and 384 is a number calculated using the equation, $384 = (16 \times 16)_{Luma} + (8 \times 8)_{Chroma} \times 2$.

$$SBE(\text{Sum of Boundary Error}) = \qquad (4)$$

$$\sum_{i=0}^{15} \|Y_{Orig}(x, y+i) - Y_{Rec}(x-1, y+i)\| +$$

$$|Y_{Orig}(x+i, y) - Y_{Rec}(x+i, y-1)|] +$$

$$\sum_{i=0}^{7} [|U_{Orig}(cx, cy+i) - U_{Rec}(cx-1, cy+1)| +$$

$$|U_{Orig}(cx+i, cy) - UY_{Rec}(cx+i, cy-1)| +$$

$$\sum_{i=0}^{7} [|U_{Orig}(cx, cy+i) - V_{Rec}(cx-1, cy+1)| +$$

$$|V_{Orig}(cx+i, cy) - VY_{Rec}(cx+i, cy-1)| \therefore ABE = \frac{1}{64}SBE$$

where 64 is a number calculated using the equation, $64 = (16+16)_{Luma} + (8+8)_{Chroma} \times 2$.

The AR value and ABE value calculated as described above are compared at step S140. If the AR value is smaller than the ABE value at step S145, the optimal macroblock mode is determined to be the optimal inter mode. If the AR value is larger than the ABE value, the intra prediction is performed at step S150, and thereafter, the optimal mode of the macroblock is determined at step S155.

As disclosed in the P. Yin et al.' thesis, the J. Lee et al.' thesis, the K. P. Lim et al.'s thesis and the B. Jeon et al' thesis, the plurality of algorithms for increasing the speed of the ME module were proposed, but such conventional algorithms are based on the RDO, so that the amount of calculation is high. Accordingly, the conventional algorithms are often sensitive to input sequences and results in coding loss in the sense of image quality and compression ratio. Accordingly, a need for an algorithm, in which the speed of the ME module increases without the deterioration of image quality, is increasing.

SUMMARY OF THE INVENTION

Accordingly, the present invention has been made keeping in mind the above problems occurring in the prior art, and an object of the present invention is to provide an adaptive motion estimation and mode decision apparatus and method for an H.264 video codec, in which a possibility of real-time coding increases by considerably reducing the amount of calculation in an H.264 coder compared to a conventional technology, the deterioration of image quality and a reduction in a compression ratio do not occur, and the implementation thereof is easily achieved through several flags without the change in a conventional construction, in a software fashion.

In order to accomplish the above object, the present invention provides an adaptive motion estimation and mode decision apparatus for an H.264 video codec, including a background image detection unit for inspecting whether a macroblock corresponding to a fixed background or slowly and regularly moving image exists, and skipping the step of dividing a corresponding macroblock into smaller sized blocks and performing block mode inspection; an inter mode inspection unit for inspecting whether an irregularly or fast moving macroblock exists by performing All Zero Coefficients Block (AZCB) inspection for an inter mode on macroblocks other than the macroblock detected by the background image detection unit, and determining whether to divide a corresponding macroblock into smaller sized blocks and to perform block mode inspection on the smaller sized blocks; an intra mode inspection unit for performing AZCB inspection for an intra mode on the macroblocks and determining whether to divide a corresponding macroblock into smaller sized blocks block and to perform mode inspection on the smaller sized blocks; and a mode inspection skip unit for skipping the block mode inspection for the smaller sized blocks of the macroblock if it is determined that the block mode inspection for the smaller sized blocks of the macroblock will be skipped by the background image detection unit, the inter mode inspection unit and the intra mode inspection unit.

Preferably, the background image detection unit inspects whether the fixed background or slowly and regularly moving macroblock exists by performing AZCB inspection for a SKIP mode.

Preferably, the AZCB is generated using quantization or coefficient thresholding technique.

Preferably, the coefficient thresholding technique generates the AZCB using following Equations, $$cc(i, j) = \begin{cases} \infty & \text{if } \text{level}(i, j) > 1 \\ 3 & \text{if } \text{level}(i, j) = 1 \text{ and run\_before} = 0 \\ 2 & \text{if } \text{level}(i, j) = 1 \text{ and } 1 \leq \text{run\_before} \leq 2 \\ 1 & \text{if } \text{level}(i, j) = 1 \text{ and } 3 \leq \text{run\_before} \leq 5 \\ 0 & \text{otherwise} \end{cases}$$

and $$C8 = \sum_{i=0}^{3} \sum_{j=0}^{15} cc(i, j),$$

$$C16 = \sum_{i=0}^{3} C8(i),$$

$$AZCB(\text{Block } 8 \times 8) = \begin{cases} 1 & \text{if } C8 \leq T_{C8} \\ 0 & \text{otherwise} \end{cases},$$

$$AZCB(\text{Block } 16 \times 16) = \begin{cases} 1 & \text{if } C16 \leq T_{C16} \\ 0 & \text{otherwise} \end{cases},$$

where cc(i,j) is a coefficient cost function, level(i,j) is an absolute value of the coefficient, run_before is a number of successive zero coefficients located before a coefficient other than zero, $T_{C8}$ and $T_{C16}$ are threshold values for determining 8×8 and 16×16 blocks to be the AZCBS, respectively, and C8 and C16 are total coefficient cost values of the 8×8 and 16×16 blocks, respectively.

Preferably, the inter mode inspection unit performs motion vector search, Rate-Distortion cost (RDcost), and AZCB inspection for a P16×16 mode of the macroblock, performs motion vector search, Rdcost, AZCB inspection for a P8×8 mode of the macroblock if it is determined that inspection will be required on smaller blocks for the P16×16 mode, and performs the motion vector and RDcost inspection for a P4×4 mode only if it is determined that inspection will be required on the smaller blocks for the P8×8 mode.

Preferably, if blocks positioned to left, upper, upper right and upper left sides of the corresponding macroblock are all intra mode blocks, the intra mode inspection unit performs Intra Prediction Mode (IPM), Rdcost, AZCB inspection for the I16×16 mode of the macroblock in combination with a chroma I8×8 mode i (i=0, 1, 2, 3), and performs IPM, RDcost inspection for an I4×4 mode of the macroblock if it is determined that inspection will be required on the smaller blocks for the I16×16 mode; and if at least one of the blocks positioned to the left, upper, upper right and upper left sides of the corresponding macroblock is an inter mode block, the intra mode inspection unit obtains an IPM and a CMode from the chroma I8×8 mode of the macroblock, performs IPM, Rdcost, and AZCB inspection for the I16×16 mode in combination with the CMode, and performs IPM and RDcost inspection for the I4×4 mode of the macroblock if it is determined that inspection will be required on the smaller blocks for the I16×16 mode.

Preferably, the CMode is calculated using a Sum of Absolute Transformed Differences (SATD) method.

Preferably, the mode inspection skip unit skips block mode inspection for an I4×4 mode that is most expensive coding mode in regards to rate and distortion.

In addition, the present invention provides an H.264 video coder, including one of the above-described adaptive motion estimation and mode decision apparatuses for the H.264 video codec.

In addition, the present invention provides an adaptive motion estimation and mode decision method for an H.264 video codec, comprising the steps of: (a) calculating an RDcost for a SKIP mode and performing AZCB(SKIP) inspection for $T_{C16}$=4; (b) calculating a motion vector and an RDcost for a P16×16 mode and performing AZCB(P16×16) inspection for $T_{C16}$=5; (c) inspecting whether $C16_{SKIP}$ is zero; (d) setting bSkipI4×4, which is a Intra 4×4 mode skip flag, to TRUE if the $C16_{SKIP}$ is zero, and proceeding to step (o); (e) calculating motion vectors and RDcosts for P16×8 and P8×16 modes if the $C16_{SKIP}$ is not zero; (f) inspecting whether a value of an AZCB(P16×8) is one or the value of an AZCB(P8×16) is one; (g) setting bSkipI4×4 to TRUE if the value of the AZCB(P16×8) or AZCB(P8×16) is one; (h) inspecting whether a value of an AZCB(SKIP) is one, setting the bSkipI4×4 to TRUE if the value of the AZCB(SKIP) is one, and proceeding to step (o); (j) inspecting whether a value of an AZCB(P16×16) is one, setting the bSkipI4×4 to TRUE if the value of the AZCB(P16×16) is one, and proceeding to step (o); (k) calculating motion vectors and RDcosts for P8×8, P8×4 and P4×8 modes, and calculating an AZCB(P8×8) for $T_{C8}$=1; (l) inspecting whether a value of the AZCB(P8×8) is one; (m) calculating a motion vector and an RDcost for the P4×4 mode if the AZCB(P8×8) is not one; (n) detecting whether a 8×8 block, which has not been inspected, exists; (o) determining an intra block mode; and (p) selecting an optimal mode.

Preferably, the AZCB is generated using following Equations, $$cc(i, j) = \begin{cases} \infty & \text{if } \text{level}(i, j) > 1 \\ 3 & \text{if } \text{level}(i, j) = 1 \text{ and run\_before} = 0 \\ 2 & \text{if } \text{level}(i, j) = 1 \text{ and } 1 \leq \text{run\_before} \leq 2 \\ 1 & \text{if } \text{level}(i, j) = 1 \text{ and } 3 \leq \text{run\_before} \leq 5 \\ 0 & \text{otherwise} \end{cases}$$

and $$C8 = \sum_{i=0}^{3} \sum_{j=0}^{15} cc(i, j),$$

$$C16 = \sum_{i=0}^{3} C8(i),$$

$$AZCB(\text{Block } 8 \times 8) = \begin{cases} 1 & \text{if } C8 \leq T_{C8} \\ 0 & \text{otherwise} \end{cases},$$

$$AZCB(\text{Block } 16 \times 16) = \begin{cases} 1 & \text{if } C16 \leq T_{C16} \\ 0 & \text{otherwise} \end{cases},$$

where cc(i,j) is a coefficient cost function, level(i,j) is an absolute value of the coefficient, run_before is a number of successive zero coefficients located before a coefficient other than zero, $T_{C8}$ and $T_{C16}$ are threshold values for determining 8×8 and 16×16 blocks to be AZCBs, respectively, and C8 and C16 are total coefficient cost values of the 8×8 and 16×16 blocks, respectively.

Preferably, the step of determining the intra block mode includes the steps of: (o-a) inspecting whether blocks positioned to left, upper, upper right and upper left sides of the macroblock are intra mode blocks; if the blocks positioned to the left, upper, upper right and upper left sides of the macroblock are all intra mode blocks: (o-b) calculating an IPM and an RDcost in combination with the I16×16 mode and the chroma I8×8 mode i (i=0, 1, 2, 3); (o-c) inspecting whether the value of the AZCB(I16×16) is one or the bSkipI4×4 is TRUE; (o-d) calculating the IPM and RDcost in combination with the I4×4 mode and the chroma I8×8 mode i (i=0) if the value of the AZCB(I16×16) is not one and the bSkipI4×4 is not TRUE; (o-e) increasing a value of i by one, inspecting whether i<4 is TRUE, and proceeding to step (o-b) if i<4; if one of the block positioned on the left, upper, upper right and upper left sides of the macroblock is an inter mode block: (o-f) calculating an IPM for the chroma I8×8 mode using the SATD method; (o-g) calculating an IPM and an RDcost for the I16×16 mode using the calculated chroma mode; (o-h) inspecting whether the value of the AZCB(I16×16) is one or bSkipI4×4 is TRUE; and (o-i) calculating an IPM and an RDcost for the I4×4 mode if the value of the AZCB(I16×16) is not one and the bSkipI4×4 is not TRUE.

In addition, the present invention provides an H.264 video coder, performing motion estimation and mode decision using an adaptive motion estimation and mode decision method for the H.264 video codec set forth in any of claims 10 to 12.

In addition, the present invention provides a computer-readable recording medium storing a program for executing the functions of: inspecting whether a macroblock corresponding to a fixed background or slowly and regularly moving image exists, and skipping the step of dividing a corresponding macroblock into smaller sized blocks and performing block mode inspection; performing AZCB inspection for an inter mode on macroblocks other than the macroblock corresponding to the fixed background or slowly and regularly moving image, determining whether an irregularly or fast moving block exists, and determining whether to divide a corresponding macroblock into smaller sized blocks and to perform the block mode inspection on the smaller sized blocks; performing AZCB inspection for an intra mode on the macroblocks, determining whether to divide a corresponding macroblock into smaller sized blocks and to perform the block mode inspection on the smaller sized blocks; and skipping the block mode inspection for the smaller sized blocks of the macroblock if it is determined that the block mode inspection for the smaller sized blocks of the macroblock will be skipped by the above-described functions.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
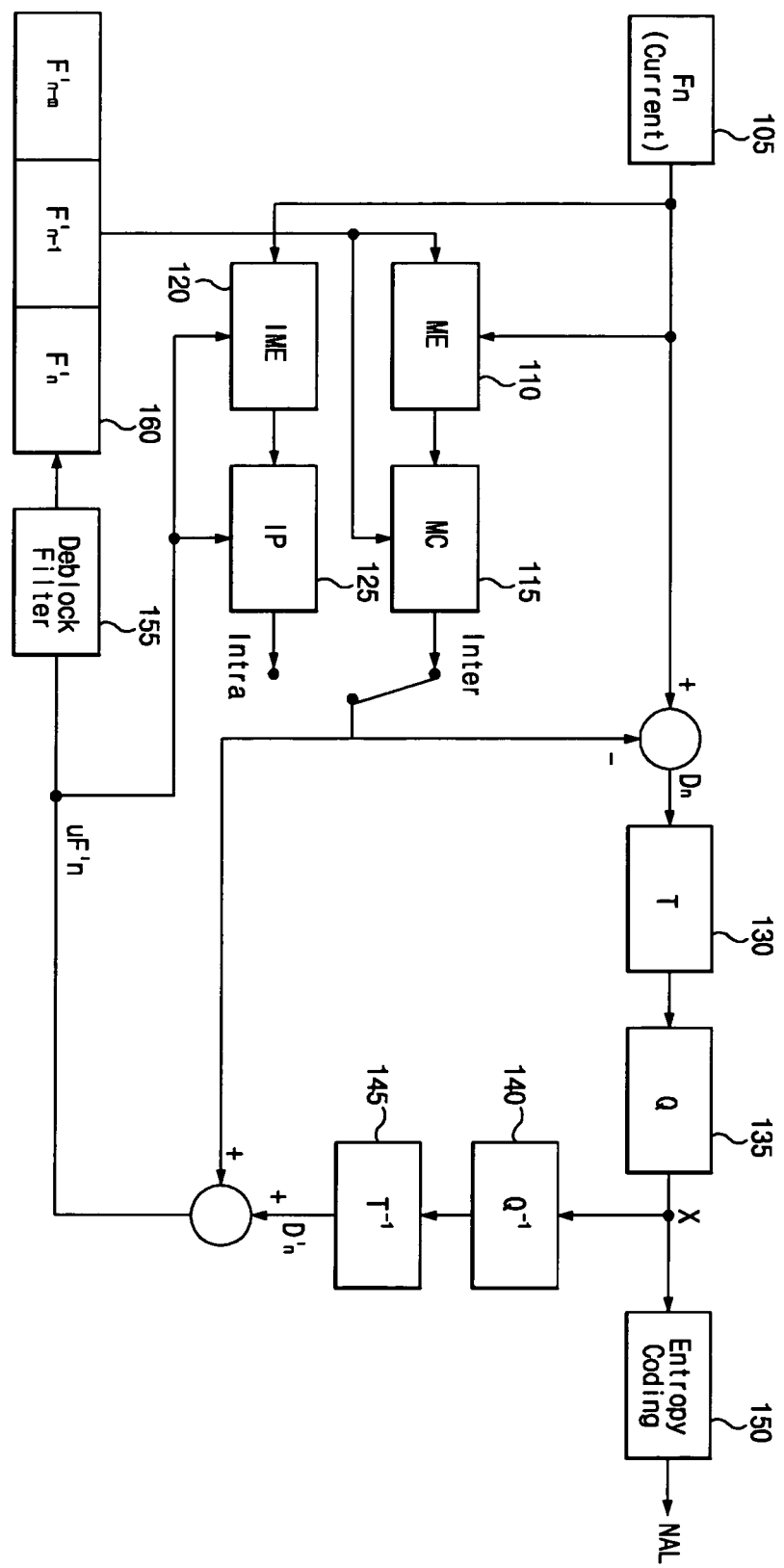
FIG. 1 is a block diagram showing an example of a coder used in a conventional H.264 video coding standard.
Figure 2:
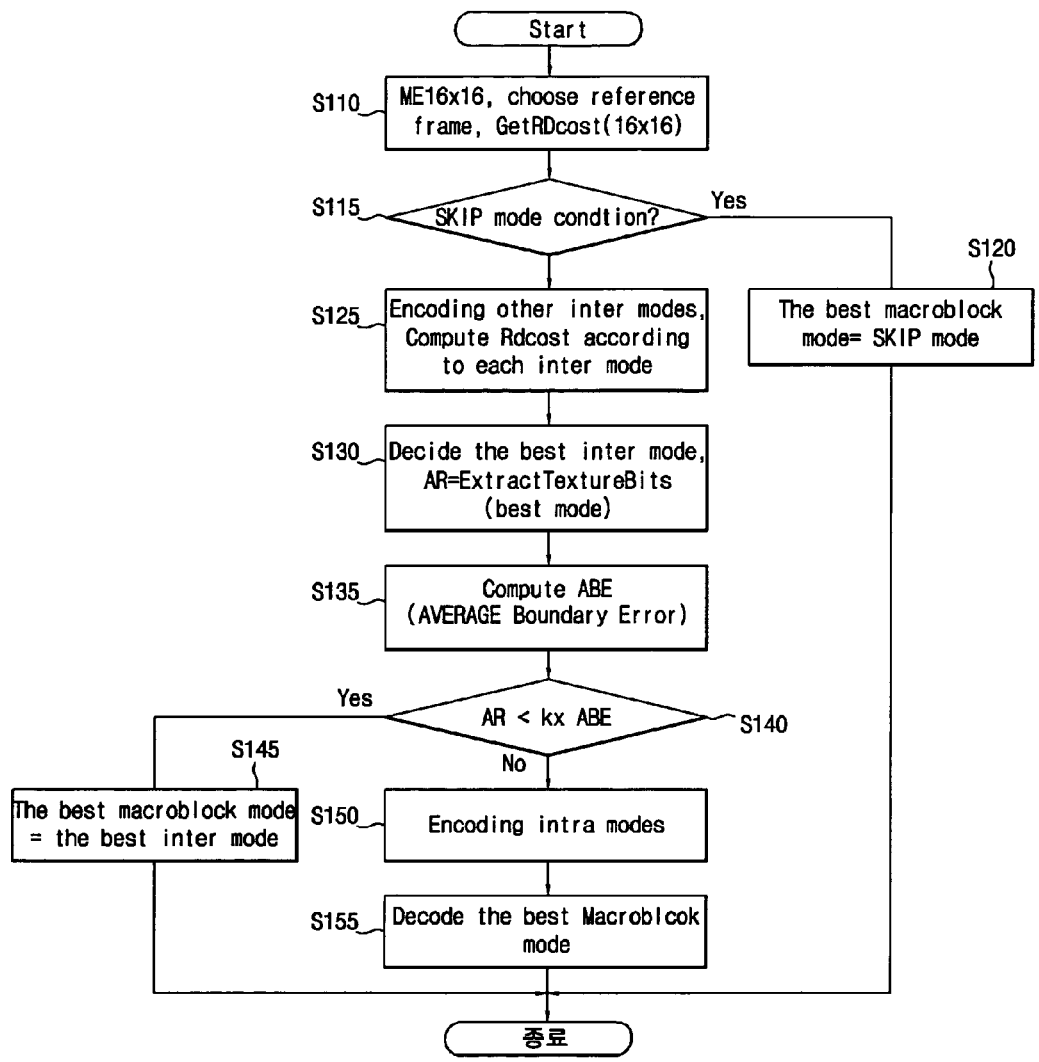
FIG. 2 is a flowchart showing an example of a macroblock mode decision method in the conventional H.264 coder.

Reference now should be made to the drawings, in which the same reference numerals are used throughout the different drawings to designate the same or similar components.

An adaptive motion estimation and mode decision apparatus and method for an H.264 video codec according to the present invention is described in detail below.

Figure 3:
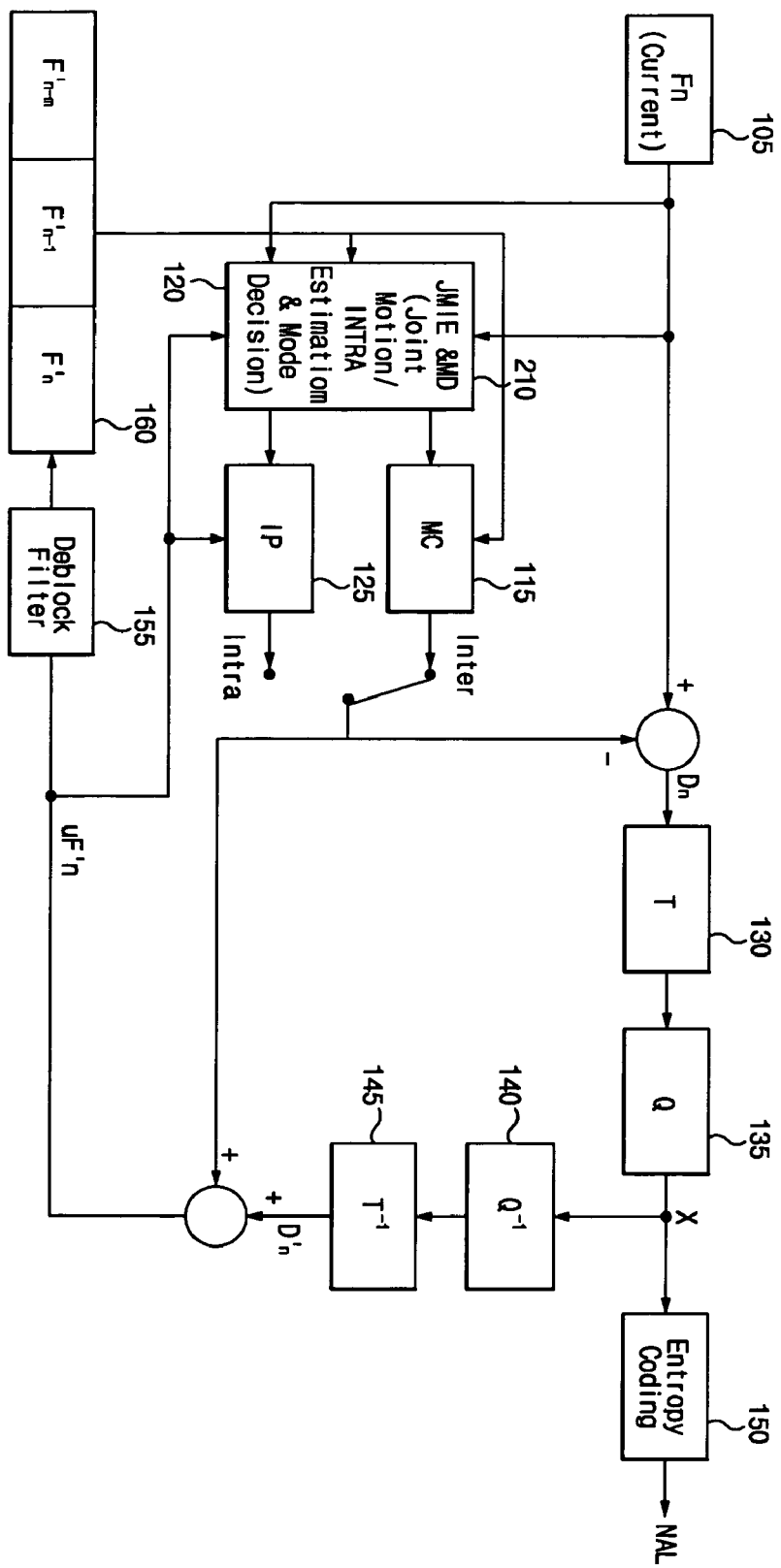
FIG. 3 is a block diagram showing a coder including an adaptive motion estimation and mode decision apparatus for an H.264 video codec according to the present invention.

FIG. 3 is a block diagram showing a coder including the adaptive motion estimation and mode decision apparatus for the H.264 video codec according to the present invention. As shown in the drawing, the H.264 coder including the adaptive motion estimation and mode decision apparatus for the H.264 video codec according to the present invention includes a Joint Motion/INTRA Estimation & Mode Decision (JMIE&MD) apparatus 210, an MC module 115, an IP module 125, a T module 130, a Q module 135, a $Q^{-1}$ module 140, a $T^{-1}$ module 145, an entropy coding module 150, a deblocking filter 155 and a frame memory 160.

The MC module 115, the IP module 125, the T module 130, the Q module 135, the $Q^{-1}$ module 140, the $T^{-1}$ module 145, the entropy coding module 150, the deblocking filter 155 and the frame memory 160 are the same as those shown in the block diagram of FIG. 1 that shows the coder used in the conventional H.264 video standard, so that descriptions thereof are omitted.

The JMIE&MD apparatus 210 jointly optimizes motion estimation and macroblock mode decision. The functions of the JMIE&MD apparatus 210 are described in detail with reference to FIGS. 4 to 6.

The JMIE&MD apparatus 210 uses a high correlation between video frames that can be detected using All Zero Coefficients Block (AZCB) characteristics. An AZCB indicates a block, such as a 4×4, 8×8 or 16×16 block, in which all quantized coefficients are zero. Such an AZCB is generated by simple quantization or a coefficient thresholding technique. The coefficient thresholding technique is disclosed in the JM72 (refer to http://bs.hhi.de/~suchring/tml/download), and has a purpose of increasing the coding efficiency of the coder. That is, in the H.264 standard, a possibility in which only a single quantized coefficient has a value other than zero in the 8×8 or 16×16 block is increased by 4×4 block integer transform. Since such coefficients are too expensive to code in regards to rate and distortion, the coefficient thresholding technique does not code an entire block in such a way that an AZCB is made by substituting zero for several coefficients other than zero. That is, it is determined whether to make the block into the AZCB according to the conditions of Equations 5 and 6. In Equation 5 and 6, cc(i,j) is a coefficient cost function, level(i,j) is the absolute value of a coefficient, run_before is the number of successive zero coefficients that are located before the coefficient other than zero. Furthermore, $T_{C8}$ and $T_{C16}$ are threshold values for determining the 8×8 and 16×16 blocks to be AZCBs, respectively. C8 and C16 are the cost values of the entire coefficient of the 8×8 and 16×16 blocks, respectively.

$$cc(i, j) = \begin{cases} \infty & \text{if } \text{level}(i, j) > 1 \\ 3 & \text{if } \text{level}(i, j) = 1 \text{ and } \text{run\_before} = 0 \\ 2 & \text{if } \text{level}(i, j) = 1 \text{ and } 1 \leq \text{run\_before} \leq 2 \\ 1 & \text{if } \text{level}(i, j) = 1 \text{ and } 3 \leq \text{run\_before} \leq 5 \\ 0 & \text{otherwise} \end{cases} \quad (5)$$

$$C8 = \sum_{i=0}^{3} \sum_{j=0}^{15} cc(i, j),$$

$$C16 = \sum_{i=0}^{3} C8(i),$$

$$AZCB(\text{Block } 8 \times 8) = \begin{cases} 1 & \text{if } C8 \leq T_{C8} \\ 0 & \text{otherwise} \end{cases},$$

$$AZCB(\text{Block } 16 \times 16) = \begin{cases} 1 & \text{if } C16 \leq T_{C16} \\ 0 & \text{otherwise} \end{cases} \quad (6)$$

The JMIE&MD apparatus 210 according to the present invention is basically based on the assumption that a high correlation exists between a current block and the prediction blocks of the reference images. Corresponding smaller-sized block mode are not inspected but skipped when the AZCB characteristics are detected while obtaining an RDcost to decide a macroblock mode. Accordingly, when the AZCB characteristics of block are detected, a large amount of ME inspection and macroblock MD inspection can be skipped, thus considerably reducing the amount of calculation.

The AZCB characteristics can be obtained as a by-product while obtaining the RDcost without separate calculation for detecting the AZCB characteristics of a block. Accordingly, the amount of calculation is minimized and the ease of implementation is maximized.

Figure 4:
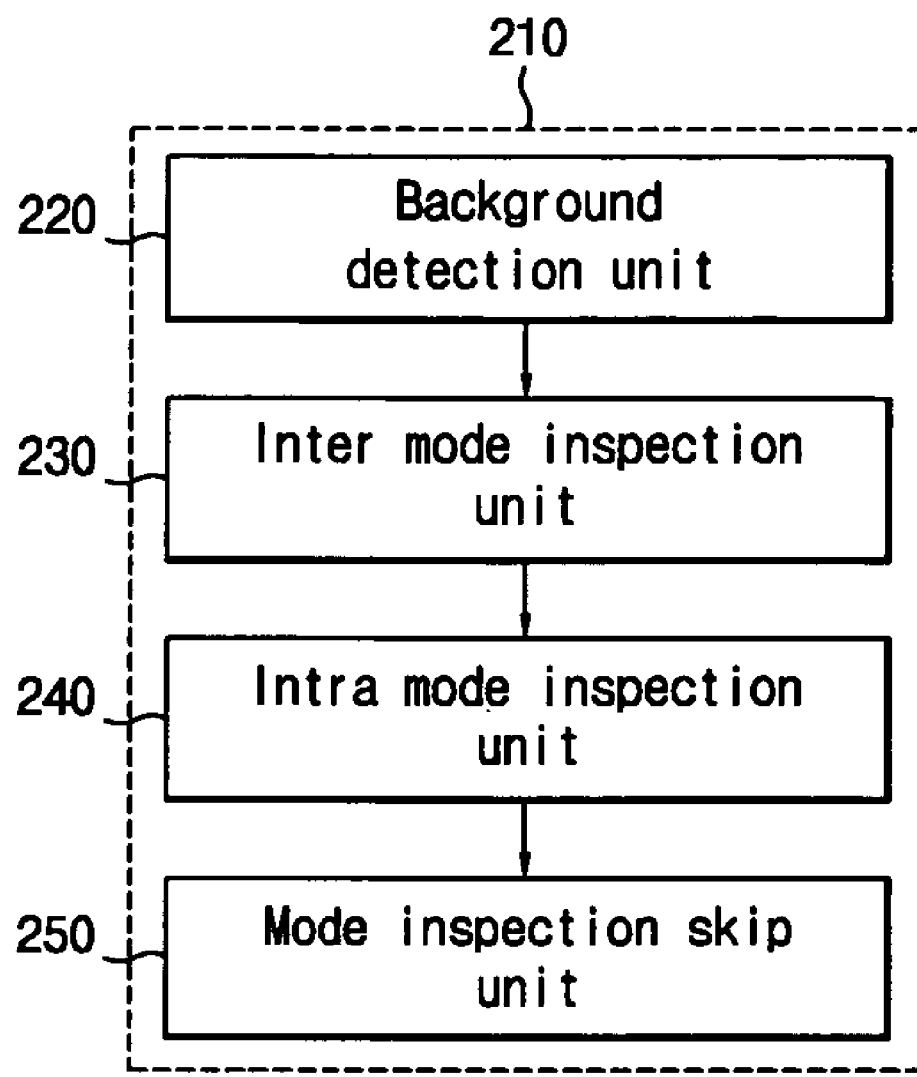
FIG. 4 is a block diagram showing the adaptive motion estimation and mode decision apparatus for the H.264 video codec according to the present invention.

FIG. 4 is a block diagram showing the JMIE&MD apparatus 210 according to the present invention. As shown in the drawing, the JMIE&MD apparatus 210 includes a background image detection unit 220, an inter mode inspection unit 230, an intra mode inspection unit 240 and a mode inspection skip unit 250.

The background image detection unit 220 decides whether macroblocks corresponding to fixed backgrounds or slowly and regularly moving images exist, and skips the steps of dividing each of the corresponding macroblocks into smaller sized blocks and performing block mode inspection.

That is, it is inspected whether a large fixed background or slowly and regularly moving block, which commonly exists due to the characteristics of natural images, exists. The steps of dividing the background or slowly and regularly moving macroblocks into smaller sized blocks and performing the block mode inspection on the resulting smaller sized blocks are not performed. Such characteristics can be obtained by performing AZCB inspection for a SKIP mode. That is, if a 16×16 sized macroblock is a background or regularly moving block, the step of performing mode inspection on smaller sized blocks, such as 16×8, 8×16, 8×8, 8×4, 4×8 and 4×4 block modes, is omitted. Such AZCB inspection is performed on a 16×16 sized macroblock using Equation 6.

The SKIP mode has a 16×16 macroblock size, and has a motion vector (0,0) or motion vector estimated from surrounding blocks, so that the SKIP mode is suitable for detecting a fixed background or slowly and regularly moving large block.

The inter mode inspection unit 230 decides whether irregularly moving blocks or fast moving blocks exist by performing AZCB inspection for an inter mode on macroblocks other than the macroblocks detected by the background image detection unit 220, and decides whether to divide each of corresponding macroblocks into smaller sized blocks and perform the block mode inspection on the smaller sized blocks.

That is, motion vector search, Rdcost, and AZCB inspection is performed on the P16×16 block of the macroblock. If it is determined that inspection will be required on the smaller blocks for the P16×16 mode, motion vector search, Rdcost, and AZCH inspection is performed for the P8×8 mode of the macroblock. Only in the case where it is determined that inspection will be required on the smaller blocks for the P8×8 mode, the motion vector search and RDcost inspection is performed on the P4×4 mode.

In more detail, irregularly moving blocks or fast moving blocks are detected by performing the AZCB inspection on macroblocks and blocks formed by the division of the macroblock. Such inspection can be performed for the P16×16 and P8×8 modes by calculating motion vectors and RDcost values using Equations 1 and 2, and the AZCB inspection is performed using Equation 6.

In other words, it is inspected for a P16×16 mode whether irregularly and fast moving blocks exist. If the P16×16 mode block is an irregularly and fast moving block, the inspection is not performed on smaller sized blocks in the corresponding block, that is, 8×8, 8×4, 4×8 and 4×4 sized blocks. However, inspection can be performed for 16×8 and 8×16 sized modes.

Thereafter, it is inspected for the P8×8 mode whether an irregularly or fast moving block exists. If, for the P8×8 mode, the irregularly or fast moving block exists, motion vector search and Rdcost inspection is not performed on smaller sized blocks in the corresponding block, that is, 4×4 sized block.

Furthermore, if, for the P16×16 and P8×8 modes, an irregularly and fast moving block does not exist, inspection is sequentially performed on the P8×4, P4×8 and P4×4 sized blocks.

Through such inspection, if the P16×16, P16×8 or P8×16 mode blocks are AZCBs, I4×4 mode inspection, which is most expensive in regards to rate and distortion, is skipped, thus reducing the amount of calculation.

After the inter mode inspection unit 230 performs mode inspection on blocks of all sizes, the intra mode inspection unit 240 performs the AZCB inspection for an intra mode on macroblocks and determines whether to divide the corresponding macroblock into smaller sized blocks and to perform block mode inspection on the smaller sized blocks.

That is, if blocks positioned to the left, upper, upper right and upper left sides of a corresponding macroblock are all the intra mode blocks, Intra Prediction Mode (IPM),Rdcost, and AZCB inspection is performed on the macroblock for the I16×16 mode in combination with the chroma i8×8 mode i (i=0, 1, 2, 3) of the macroblock. If it is determined that inspection will be performed on smaller blocks for the I16×16 mode, the IPM and RDcost inspection is performed on the I4×4 mode of the macroblock. If at least one of the blocks is an inter mode block, IPM and CMode are obtained from the chroma I8×8 mode of the macroblock, and IPM, Rdcost, and AZCB inspection is performed on the I16×16 mode in combination with the CMode. If it is determined that inspection will be required on smaller blocks for the I16×16 mode, the IPM and RDcost inspection is performed for the I4×4 mode of the macroblock.

In more detail, the modes of the blocks positioned to the left, upper, upper right and upper left sides of the corresponding macroblock are inspected. If one of them is an inter mode, a chroma prediction mode is previously obtained for a chroma I8×8 using a Sum of Absolute Transformed Differences (SATD) method, intra prediction and mode decision are performed for the I16×16 mode using the chroma prediction mode, and it is determined whether the intra prediction and mode decision will be performed for I4×4.

If the modes of all the blocks are intra modes as a result of the mode inspection, the intra prediction and mode decision are performed for a combination of the I16×16 mode and chroma I8×8 mode i (i=0, 1, 2, 3). Furthermore, it is determined whether the intra prediction and mode decision will be required for the combination of I4×4 mode and chroma I8×8 mode i (i=0, 1, 2, 3) through the AZCB inspection of I16×16 mode.

If a correlation between the macroblock modes is proved through the AZCB inspection, the mode inspection skip unit 250 skips the I4×4 mode inspection, which is the most expensive inspection in regards to rate and distortion, for the corresponding macroblock.

That is, when a high correlation between block modes is proved by performing various inspection and skip unit 220 and the block motion detection and mode selection range limitation unit 230, that is, it is determined through the above-described inspection that mode inspection for the I4×4 block will be preferably skipped, the mode inspection skip unit 250 skips I4×4 mode inspection that is the most expensive inspection in regards to rate and distortion. For this purpose, bSkipI4×4, which is a mode skip flag, is set to TRUE on the corresponding block, and the I4×4 mode inspection is not performed on the corresponding block (macroblock, 8×8 block, etc.).

Figure 5:
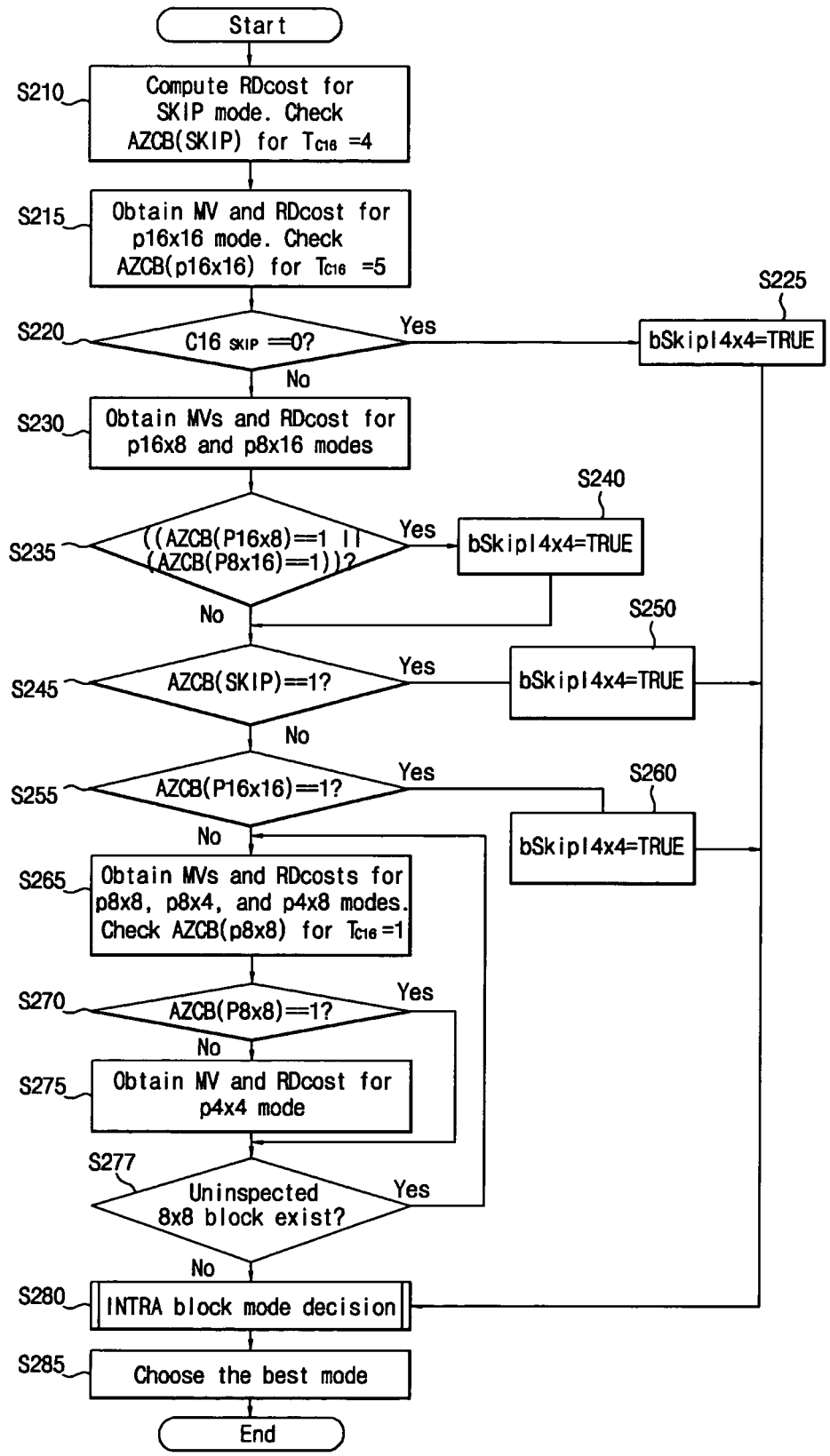
FIG. 5 is a flowchart showing an adaptive motion estimation and mode decision method for the H.264 video codec according to the present invention.
Figure 6:
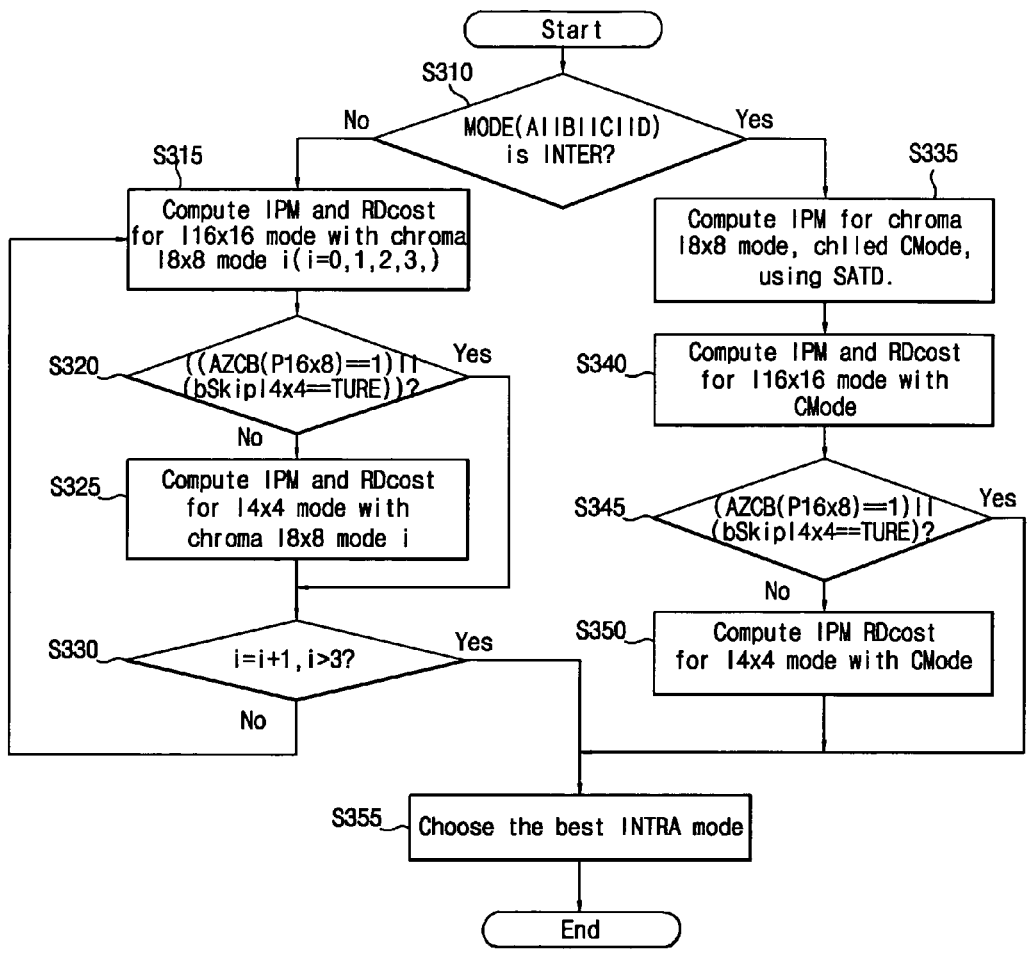
FIG. 6 is a flowchart showing the step of determining an Intra block mode in the adaptive motion estimation and mode decision method for the H.264 video codec according to the present invention.

An adaptive motion estimation and mode decision method for the H.264 video codec according to the present invention is shown in FIGS. 5 and 6.

FIG. 5 is a flowchart showing the adaptive motion estimation and mode decision method for the H.264 video codec according to the present invention.

In the adaptive motion estimation and mode decision method for the H.264 video codec according to the present invention, motion estimation is performed based on Equation 1, and mode inspection for determining a macroblock mode is performed based on Equations 2, 5 and 6.

First, an RDcost for a SKIP mode is calculated, AZCB (SKIP) inspection is performed for $T_{C16}=4$ during the step of calculating the RDcost at step S210.

Thereafter, a motion vector and an RDcost for a P16×16 mode are calculated, and AZCB(P16×16) inspection is performed for $T_{C16}=5$ during the step of calculating the motion vector and the RDcost at step S215.

It is inspected whether $C16_{SKIP}$ is zero at step S220.

If, as a result of the inspection, the $C16_{SKIP}$ is zero; bSkipI4×4, which is an I4×4 mode skip flag, is set to TRUE at step S225, and the process proceeds to the step of determining an intra block mode at step S280.

If, as a result of the inspection, the $C16_{SKIP}$ is not zero, motion vectors and RDcosts for P16×8 and P8×16 modes are calculated at step S230.

Thereafter, it is inspected whether the value of the AZCB (P16×8) or AZCB(P8×16) is one at step S235.

If, as a result of the inspection, the value of the AZCB(P16×8) or AZCB(8×16) is one, the bSkipI4×4 is set to TRUE at step S240.

If, as a result of the inspection, the value of the AZCB(P16×8) or AZCB(8×16) is not one, it is inspected whether the value of the AZCB(SKIP) is one at step S245. If the value of an AZCB(SKIP) is one at step S250, the bSkipI4×4 is set to TRUE and the process proceeds to the step of determining an intra block mode at step S280.

If, as a result of the inspection at step S245, the value of the AZCB(SKIP) is not one, it is inspected whether the value of an AZCB(P16×16) is one at step S255, the bSkipI4×4 is set to TRUE at step S260 if the value of the AZCB(P16×16) is one, and the process proceeds to the step of determining an intra block mode at step S280.

If the values of the AZCB(SKIP) and the AZCB(P16×16) are not one, inter 8×8 block mode selection described below is performed at steps S265, S270 and S275.

Motion vectors and RDcosts for P8×8, P8×4 and P4×8 are obtained, and the value of an AZCB(P8×8) for $T_{C8}=1$ is calculated during the step of calculating the motion vectors and RDcosts at step S265.

It is inspected whether the value of the AZCB(P8×8) is one at step S270, the step S280 is performed if the value of the AZCB(P8×8) is one, and a motion vector and an RDcost for the P4×4 mode are calculated if the value of the AZCB(P8×8) is not one at step S275.

If an 8×8 block, which is still not inspected, remains, the process proceeds to step S265 at step S277.

Thereafter, intra block mode determination is performed at step S280, and a mode capable of minimizing the RDcost is selected as an optimal mode at step S285.

The step S280 of determining the intra block mode is described in detail with reference to FIG. 6.

FIG. 6 is a flowchart showing the step of determining an Intra block mode in the adaptive motion estimation and mode decision method for the H.264 video codec according to the present invention.

First, it is inspected whether blocks positioned to the left, upper, upper right and upper left sides of a current macroblock are inter mode blocks at step S310.

If the blocks are all the inter mode blocks at step S310, the process proceeds to the following step.

An IPM and an RDcost for the combination of an I16×16 mode and a chroma I8×8 mode i(i=0) are obtained at step S315.

It is inspected whether the value of an AZCB(I16×16) is one or the bSkipI4×4 is TRUE at step S320. If the value of the AZCB(I16×16) is not one and the bSkipI4×4 is not TRUE, the IPM and the RDcost for the combination of an I4×4 mode and the chroma I8×8 mode i are obtained at step S325.

Thereafter, the value of i is increased by one at step S330. The process proceeds to step S315 and step S315 is performed again if the value of i is smaller than four, and the process proceeds to step S355 if the value of i is not smaller than four.

If it is inspected that at least one of the blocks is an inter mode block at step S310, the process proceeds to the following step.

An IPM for the chroma I8×8 mode is obtained using the SATD method at step S335. The obtained chroma mode is referred to as a CMode.

An IPM and RDcost for the I16×16 mode is obtained using the CMode at step S340.

It is inspected whether the value of an AZCB(I16×16) is one or a bSkipI4×4 is TRUE at step S345. If the value of the AZCB(I16×16) is not one and the bSkipI4×4 is not TRUE, the IPM and RDcost for the I4×4 mode is obtained using the CMode at step S350.

A conventional technology is characterized in that mode inspection is all skipped if the SKIP mode is detected. Accordingly, since the conventional technology is disadvantageous in the increase of an error rate, steps S210, S220 and S280 are always performed in the adaptive motion estimation and mode decision method for the H.264 video codec according to the present invention so as to compensate for the disadvantage.

Although the intra block mode decision has been described in detail with reference to FIG. 6, the H.264 standard supports the intra prediction for the chroma block as well as a luma block in order to increase the efficiency of the intra prediction. As a result, a problem in intra mode decision becomes a problem in the joint optimization of intra prediction between the luma block and the chroma block. In this case, the joint optimization is performed in such a way that an RDcost is calculated by obtaining luma intra prediction modes for chroma intra prediction modes, and a combination of a chroma mode and a luma mode, which has the smallest cost, is selected as a final intra mode, so that the joint optimization has a disadvantage in that a large amount of calculation is required.

Accordingly, in the adaptive motion estimation and mode decision method for the H.264 video codec according to the present invention, the intra mode decision is performed using the joint optimization, in order to reduce the amount of calculation, only in the case where the modes of blocks (positioned on the left, upper, upper right and upper left sides of a current block) adjacent to a current block are all intra modes. Otherwise, the chroma prediction is calculated first, and the luma prediction is performed only for the chroma prediction mode after the calculation, thus reducing the amount of calculation.

As described above, according to the present invention, the amount of calculation in the H.264 coder is considerably reduced compared to the conventional technology, so that a possibility of real-time coding is increased, and the deterioration of image quality and a reduction in a compression ratio do not occur. Furthermore, the present invention can be implemented through several flags, without a change in a conventional construction, in a software fashion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An adaptive motion estimation and mode decision apparatus for an H.264 video codec, comprising:
 a background image detection unit for inspecting whether a macroblock corresponding to a fixed background or slowly and regularly moving image exists, and skipping the step of dividing a corresponding macroblock into smaller sized blocks and performing block mode inspection;
 an inter mode inspection unit for inspecting whether an irregularly or fast moving macroblock exists by performing All Zero Coefficients Block (AZCB) inspection for an inter mode on macroblocks other than the macroblock detected by the background image detection unit, and determining whether to divide a corresponding macroblock into smaller sized blocks and to perform block mode inspection on the smaller sized blocks, wherein the inter mode inspection unit performs motion vector search, Rate-Distortion cost (RDcost), and AZCB inspection for a P16×16 mode of the macroblock, performs motion vector search, RDcost, and AZCB inspection for a P8×8 mode of the macroblock if it is determined that inspection will be required on smaller blocks for the P16×16 mode, and performs the motion vector search and RDcost inspection for a P4×4 mode only if it is determined that inspection will be required on the smaller blocks for the P8×8 mode;
 an intra mode inspection unit for performing AZCB inspection for an intra mode on the macroblocks and determining whether to divide a corresponding macroblock into smaller sized blocks block and to perform mode inspection on the smaller sized blocks; and
 a mode inspection skip unit for skipping the block mode inspection for the smaller sized blocks of the macroblock if it is determined that the block mode inspection for the smaller sized blocks of the macroblock will be skipped by the background image detection unit, the inter mode inspection unit, and the intra mode inspection unit.

2. The apparatus as set forth in claim 1, wherein the background image detection unit inspects whether the fixed background or slowly and regularly moving macroblock exists by performing AZCB inspection for a SKIP mode, wherein the SKIP mode uses a 16×16 macroblock size with a zero motion vector or a motion vector estimated from surrounding macroblocks.

3. The apparatus as set forth in claim 1, wherein a predetermined algorithm generates an AZCB using the following Equations, $$cc(i,j) = \begin{cases} \infty & \text{if } \text{level}(i,j) > 1 \\ 3 & \text{if } \text{level}(i,j) = 1 \text{ and } \text{run\_before} = 0 \\ 2 & \text{if } \text{level}(i,j) = 1 \text{ and } 1 \leq \text{run\_before} \leq 2 \\ 1 & \text{if } \text{level}(i,j) = 1 \text{ and } 3 \leq \text{run\_before} \leq 5 \\ 0 & \text{otherwise} \end{cases}$$

and $$C8 = \sum_{i=0}^{3} \sum_{j=0}^{15} cc(i,j),$$

$$C16 = \sum_{i=0}^{3} C8(i),$$

$$AZCB(\text{Block } 8 \times 8) = \begin{cases} 1 & \text{if } C8 \leq T_{C8} \\ 0 & \text{otherwise} \end{cases},$$

$$AZCB(\text{Block } 16 \times 16) = \begin{cases} 1 & \text{if } C16 \leq T_{C16} \\ 0 & \text{otherwise} \end{cases},$$

where $cc(i,j)$ is a coefficient cost function, $\text{level}(i,j)$ is an absolute value of the coefficient, run_before is a number of successive zero coefficients located before a coefficient other than zero, $T_{C8}$ and $T_{C16}$ are threshold values for determining 8×8 and 16×16 blocks to be the AZCBs, respectively, and C8 and C16 are total coefficient cost values of the 8×8 and 16×16 blocks, respectively.

4. The apparatus as set forth in claim 1, wherein:
 if blocks positioned to left, upper, upper right and upper left sides of the corresponding macroblock are all intra mode blocks,
 the intra mode inspection unit performs Intra Prediction Mode (IPM), RDcost, and AZCB inspection for the I16×16 mode of the macroblock in combination with a chroma I8×8 mode i (i=0, 1, 2, 3), and performs IPM, RDcost inspection for an I4×4 mode of the macroblock if it is determined that inspection will be required on the smaller blocks for the I16×16 mode; and
 if at least one of the blocks positioned to the left, upper, upper right and upper left sides of the corresponding macroblock is an inter mode block,
 the intra mode inspection unit obtains an IPM and a CMode from the chroma I8×8 mode of the macroblock, performs IPM, RDcost, and AZCB inspection for the I16×16 mode in combination with the CMode, and performs IPM and RDcost inspection for the I4×4 mode of the macroblock if it is determined that inspection will be required on the smaller blocks for the I16×16 mode.

5. The apparatus as set forth in claim 4, wherein the CMode is calculated using a Sum of Absolute Transformed Differences (SATD) method.

6. The apparatus as set forth in claim 1, wherein the mode inspection skip unit skips block mode inspection for an I4×4 mode that is one of most expensive coding modes in regards to rate and distortion.

7. An H.264 video coder, including an adaptive motion estimation and mode decision apparatus for the H.264 video codec set forth in any of claims 1, 2, 3, and 4 to 6.

8. An adaptive motion estimation and mode decision method executed by an H.264 video coder to increase the motion estimation speed for an H.264 video codec, comprising the steps of:
(a) calculating an RDcost for a SKIP mode and performing AZCB(SKIP) inspection for $T_{C16}$=4;
(b) calculating a motion vector and an RDcost for a P16×16 mode and performing AZCB(P16×16) inspection for $T_{c16}$=5;
(c) inspecting whether $C16_{SKIP}$ is zero;
(d) setting bSkipI4×4, which is a mode skip flag, to TRUE if the $C16_{SKIP}$ is zero, and proceeding to step (o);
(e) calculating motion vectors and RDcosts for P16×8 and P8×16 modes if the $C16_{SKIP}$ is not zero;
(f) inspecting whether a value of an AZCB(P16×8) is one or the value of an AZCB(P8×16) is one;
(g) setting bSkipI4×4 to TRUE if the value of the AZCB (P16×8) or AZCB(P8×16) is one;
(h) inspecting whether a value of an AZCB(SKIP) is one, setting the bSkipI4×4 to TRUE if the value of the AZCB (SKIP) is one, and proceeding to step (o);
(j) inspecting whether a value of an AZCB(P16×16) is one, setting the bSkipI4×4 to TRUE if the value of the AZCB (P16×16) is one, and proceeding to step (o);
(k) calculating motion vectors and RDcosts for P8×8, P8×4 and P4×8 modes, and calculating an AZCB(P8×8) for $T_{C8}$=1;
(l) inspecting whether a value of the AZCB(P8×8) is one;
(m) calculating a motion vector and an RDcost for the P4×4 mode if the AZCB(P8×8) is not one;
(n) detecting whether an 8×8 block, which has not been inspected, exists;
(o) determining an intra block mode; and
(p) selecting an optimal mode, wherein a Joint Motion/INTRA Estimation and Mode Decision apparatus of the H.264 video coder codes at a higher speed to produce an image without deteriorating the image quality.

9. The method as set forth in claim 8, wherein the AZCB is generated using following Equations, $$cc(i, j) = \begin{cases} \infty & \text{if } level(i, j) > 1 \\ 3 & \text{if } level(i, j) = 1 \text{ and } run\_before = 0 \\ 2 & \text{if } level(i, j) = 1 \text{ and } 1 \leq run\_before \leq 2 \\ 1 & \text{if } level(i, j) = 1 \text{ and } 3 \leq run\_before \leq 5 \\ 0 & \text{otherwise} \end{cases}$$

and $$C8 = \sum_{i=0}^{3} \sum_{j=0}^{15} cc(i, j),$$

$$C16 = \sum_{i=0}^{3} C8(i),$$

$$AZCB(\text{Block } 8 \times 8) = \begin{cases} 1 & \text{if } C8 \leq T_{C8} \\ 0 & \text{otherwise} \end{cases},$$

$$AZCB(\text{Block } 16 \times 16) = \begin{cases} 1 & \text{if } C16 \leq T_{C16} \\ 0 & \text{otherwise} \end{cases},$$

where cc(i, j) is a coefficient cost function, level(i, j) is an absolute value of the coefficient, run_before is a number of successive zero coefficients located before a coefficient other than zero, $T_{C8}$ and $T_{C16}$ are threshold values for determining 8×8 and 16×16 blocks to be AZCBs, respectively, and C8 and C16 are total coefficient cost values of the 8×8 and 16×16 blocks, respectively.

10. The method as set forth in claim 8, wherein the step of determining the intra block mode comprises the steps of:
(o-a) inspecting whether blocks positioned to left, upper, upper right and upper left sides of the macroblock are intra mode blocks;
if the blocks positioned to the left, upper, upper right and upper left sides of the macroblock are all intra mode blocks:
(o-b) calculating an IPM and an RDcost in combination with the I16×16 mode and the chroma I8×8 mode i (i=0, 1, 2, 3);
(o-c) inspecting whether the value of the AZCB(I16×16) is one or the bSkipI4×4 is TRUE;
(o-d) calculating the IPM and RDcost in combination with the I4×4 mode and the chroma I8×8 mode i (i=0) if the value of the AZCB(I16×16) is not one and the bSkipI4×4 is not TRUE;
(o-e) increasing a value of i by one, inspecting whether i<4 is true, and proceeding to step (o-b) if i<4;
if one of the blocks positioned on the left, upper, upper right and upper left sides of the macroblock is an inter mode block:
(o-f) calculating an IPM for the chroma I8×8 mode using the SATD method;
(o-g) calculating an IPM and an RDcost for the I16×16 mode using the calculated chroma mode;
(o-h) inspecting whether the value of the AZCB(I161×16) is one or bSkipI4×4 is TRUE; and
(o-i) calculating an IPM and an RDcost for the I4×4 mode if the value of the AZCB(I16×16) is not one and the bSkipI4×4 is not TRUE.

11. A computer-readable recording medium storing a program for executing the functions of:
inspecting whether a macroblock corresponding to a fixed background or slowly and regularly moving image exists, and skipping the step of dividing a first corresponding macroblock into smaller sized blocks and performing block mode inspection;
performing All Zero Coefficients Block (AZCB) inspection for an inter mode on macroblocks other than the macroblock corresponding to the fixed background or slowly and regularly moving image, determining whether an irregularly or fast moving block exists by performing motion vector search, Rate-Distortion cost (RDcost), and AZCB inspection for a P16×16 mode of the macroblock, and determining whether to divide a corresponding macroblock into smaller sized blocks and to perform the block mode inspection on the smaller sized blocks, performing the motion vector search, RDcost, and AZCB inspection for a P8×8 mode of the macroblock if it is determined that inspection will be required on smaller blocks for the P16×16 mode, and performing the motion vector search and RDcost inspection for a P4×4 mode only if it is determined that inspection will be required on the smaller blocks for the P8×8 mode;

performing AZCB inspection for an intra mode on the macroblocks, determining whether to divide a corresponding macroblock into smaller sized blocks and to perform the block mode inspection on the smaller sized blocks; and skipping the block mode inspection for the smaller sized blocks of the macroblock if it is determined that the block mode inspection for the smaller sized blocks of the macroblock will be skipped by the above functions.

12. The computer-readable recording medium as set forth in claim 11, wherein the function of inspecting whether the fixed background or slowly and regularly moving macroblock exists comprises performing AZCB inspection for a SKIP mode, wherein the SKIP mode uses a 16×16 macroblock size with a zero motion vector or a motion vector estimated from surrounding macroblocks.

13. The computer-readable recording medium as set forth in claim 11, wherein a predetermined algorithm generates an AZCB using the following Equations:

$$cc(i, j) = \begin{cases} \infty & \text{if } level(i, j) > 1 \\ 3 & \text{if } level(i, j) = 1 \text{ and run\_before} = 0 \\ 2 & \text{if } level(i, j) = 1 \text{ and } 1 \leq \text{run\_before} \leq 2 \\ 1 & \text{if } level(i, j) = 1 \text{ and } 3 \leq \text{run\_before} \leq 5 \\ 0 & \text{otherwise} \end{cases}$$

$$\text{and } C8 = \sum_{i=0}^{3} \sum_{j=0}^{15} cc(i, j),$$

$$C16 = \sum_{i=0}^{3} C8(i),$$

$$AZCB(Block\ 8 \times 8) = \begin{cases} 1 & \text{if } C8 \leq T_{C8} \\ 0 & \text{otherwise} \end{cases},$$

$$AZCB(Block\ 16 \times 16) = \begin{cases} 1 & \text{if } C16 \leq T_{C16} \\ 0 & \text{otherwise} \end{cases},$$

where cc(i, j) is a coefficient cost function, level(i, j) is an absolute value of the coefficient, run_before is a number of successive zero coefficients located before a coefficient other than zero, $T_{C8}$ and $T_{C16}$ are threshold values for determining 8×8 and 16×16 blocks to be the AZCBs, respectively, and C8 and C16 are total coefficient cost values of the 8×8 and 16×16 blocks, respectively.

14. The computer-readable recording medium as set forth in claim 11, wherein the function of performing AZCB inspection for an inter mode comprises performing motion vector search, Rate-Distortion cost (RDcost), and AZCB inspection for a P16×16 mode of the macroblock, performing motion vector search, RDcost, and AZCB inspection for a P8×8 mode of the macroblock if it is determined that inspection will be required on smaller blocks for the P16×16 mode, and performing motion vector search and RDcost inspection for a P4×4 mode only if it is determined that inspection will be required on the smaller blocks for the P8×8 mode.

15. The computer-readable recording medium as set forth in claim 11, wherein:

if blocks positioned to left, upper, upper right and upper left sides of the corresponding macroblock are all intra mode blocks, the function of performing AZCB inspection for an intra mode comprises performing Intra Prediction Mode (IPM), RDcost, and AZCB inspection for the I16×16 mode of the macroblock in combination with a chroma I8×8 mode i (i=0, 1, 2, 3), and performing IPM, RDcost inspection for an I4×4 mode of the macroblock if it is determined that inspection will be required on the smaller blocks for the I16×16 mode; and if at least one of the blocks positioned to the left, upper, upper right and upper left sides of the corresponding macroblock is an inter mode block, the function of performing AZCB inspection for an intra mode comprises obtaining an IPM and a CMode from the chroma I8×8 mode of the macroblock, performing IPM, RDcost, and AZCB inspection for the I16×16 mode in combination with the CMode, and performing IPM and RDcost inspection for the I4×4 mode of the macroblock if it is determined that inspection will be required on the smaller blocks for the I16×16 mode.

16. The apparatus of claim 1, wherein the inter mode inspection and intra mode inspection unit generate AZBCs for AZBC inspection by quantizing discrete cosine transform coefficients.

17. The computer-readable recording medium as set forth in claim 11, wherein the AZBCs are generated by quantizing discrete cosine transform coefficients.

* * * * *